United States Patent [19]

Katterheinrich et al.

[11] 4,191,605

[45] Mar. 4, 1980

[54] PACKAGE LABELING SYSTEM AND METHD FOR APPLYING A LABEL TO A PACKAGE

[75] Inventors: Fred H. Katterheinrich, Troy; James R. Small, Tipp City, both of Ohio

[73] Assignee: Hobart Corporation, Troy, Ohio

[21] Appl. No.: 962,295

[22] Filed: Nov. 20, 1978

[51] Int. Cl.[2] .......... B29C 17/00; B32B 31/00; B65C 9/08

[52] U.S. Cl. .......... 156/285; 156/297; 156/566; 156/360

[58] Field of Search .......... 156/556, 566, 360, 285, 156/297

[56] References Cited

U.S. PATENT DOCUMENTS

| | | | |
|---|---|---|---|
| 3,264,161 | 8/1966 | Stremke | 156/360 |
| 3,616,050 | 10/1971 | Schrotz | 156/556 |
| 3,616,094 | 10/1971 | Navin | 156/566 |
| 3,960,640 | 6/1976 | Mort | 156/566 |
| 3,985,603 | 10/1976 | Berner | 156/235 |
| 3,985,605 | 10/1976 | Treiber | 156/384 |
| 3,989,574 | 11/1976 | Evans | 156/566 |

*Primary Examiner*—Douglas J. Drummond
*Attorney, Agent, or Firm*—Biebel, French & Nauman

[57] ABSTRACT

A package labeling system for applying an adhesively backed label, which is received from a label transport, preferably to the bottom of a package through a label application opening in the package support, includes an applicator body and a suction tube extending through the applicator body and defining a suction opening above the body. A label supporting plate is positioned above the applicator body and pivotally mounted thereon. The plate defines a suction tube aperture and is pivotable from a horizontal position in which the suction opening is positioned within the aperture to inclined positions in which the aperture is raised above the suction opening. A spring urges the plate into its horizontal position and a partial vacuum is applied to the suction tube. A means for moving the applicator between a first position, adjacent the label transport, and a second position, is provided. In the first position, a label ejected from the label transport is received onto the label supporting plate and held thereon by suction applied through the suction opening. In the second position, the applicator is positioned in the label application opening with the label supporting plate raised substantially above the package support. The plate in the second position contacts a package to which the label is to be applied and is pivoted by the weight of the package such that the effect of the suction applied to the label through the suction opening is reduced substantially. The label is therefore released from the applicator and applied to the bottom of the package.

12 Claims, 11 Drawing Figures

PACKAGE LABELING SYSTEM AND METHD FOR APPLYING A LABEL TO A PACKAGE

BACKGROUND OF THE INVENTION

The present invention relates to a package labeling system and, more particularly, to a device for receiving an adhesively backed label from a label transport with the adhesive side of the label facing upward and, thereafter, applying the label to the bottom of a package through a label application opening in a package support.

The present invention is particularly useful in applying adhesively coated labels to the bottom of a package. The Universal Product Code (UPC), now in general use in the retail food industry, facilitates automated check-out in grocery stores and supermarkets. The code is a bar code pattern which, for prepackaged goods, specifies in machine readable notation the manufacturer and the item. With prepackaged products, this code is typically printed on a side of the product package. At the checkout stand, the checker passes the bar code symbols over a scanning arrangement, of a type known in the art. The scanning arrangement reads the coded information and transmits it to a computer which determines the cost of the item being sold and supplies this information to a checkout register for totalization. Additionally, the computer may keep track of the items sold for inventory purposes.

Since, however, between ten and thirty percent of the items sold in grocery stores are random weight items (e.g., meat, produce, cheese, etc.), UPC labels must also be printed and applied to such items in order for an automated checkout system to be employed effectively. In prior art weighing and labeling systems, a Universal Product Code printer has been connected to the scale system upon which goods are weighed after being packaged in the meat and produce department of the grocery store. The label printed by the UPC printer is received from the printer by a label transport, such as shown in U.S. Pat. No. 3,985,603, issued Oct. 12, 1976, to Berner, assigned to the assignee of the present invention. In the device disclosed in the Berner patent, the label is ejected from the label transport into a catching device and a label applicator nozzle, having a suction opening therein, lifts the label from the catching device and applies it to the bottom of a package through a label application opening in a package support.

U.S. Pat. No. 3,985,605, issued Oct. 12, 1976, to Treiber et al, discloses such a label applicator and catcher device, as well as an associated package transport system which conveys a package into proper location for application of the Universal Product Code label to the bottom thereof. The label application apparatus of the present invention is designed to be used in the system of Treiber et al and provides improved label application.

In the Treiber et al system, a label applicator nozzle defines a suction opening which is connected to a source of partial vacuum. Air flows into the suction opening at a relatively low flow rate. Since the label ejected from the label transport is caught by a catcher device, however, the partial vacuum required for the Treiber et al applicator need not be sufficient to catch the label in flight during ejection from the transport, but only sufficient to hold it on the applicator nozzle during the upward movement of the applicator. As the applicator nozzle reaches the upper limit of its travel and the label is pressed against the bottom of the package, the partial vacuum is momentarily reversed to assist in removing the label from the applicator nozzle.

The label applicator arrangement of Treiber et al, however, has several drawbacks. Although the catcher device is designed to contact a label only at non-adhesive bearing points, invariably some of the adhesive material from the back of the label is present along the label edges. Since these edges may come into contact with portions of the catcher device as a label is caught, build up of the adhesive on the catcher device will result over a period of time. After sufficient adhesive build up, labels will tend to stick to the catcher device and operation of the label applicator system may become unreliable.

Additionally, in a label applicator system, such as shown in Treiber et al, in which an adhesively backed label is held on a flat surface as the label is appled to the bottom of a package, the label may not be firmly pressed against the bottom surface of a package where this surface is curved. The bottom surface of a package may typically be curved or bowed where meats or produce are placed in a paper tray, termed a "boat," and a sheet of transparent wrapping material wrapped tightly therearound. If the wrapping material is wrapped too tightly around the package, the bottom of the package will tend to bow upward at its periphery as a result of the tension in the wrapping material. As the applicator nozzle moves upward into contact with the bottom of such a package, it is apparent that only a portion of the label may actually be pressed against the bottom of the package, since the top of the applicator nozzle will remain horizontal. Adequate pressure for adherence of the label to he package bottom may, therefore not occur.

Accordingly, it is seen that there is a need for apparatus for receiving an adhesively backed label from a label transport and applying the label to the bottom of a package, without intermediate label catching structure on which adhesive may accumulate. Further, there is a need for a reliable label applicator for applying a label to the bottom of a package, regardless of whether the bottom of the package is flat or bowed.

SUMMARY OF THE INVENTION

A package labeling system receives an adhesively backed label from a label transport with the adhesive side of the label facing upward and, thereafter, applies the label to the bottom of a package through a label application opening in a package support. This system comprises an applicator, including an applicator body, a suction tube extending through the applicator body and defining a suction opening above the body, and a label supporting plate positioned above the applicator body and pivotally mounted thereon. The plate defines a suction tube aperture. The plate is pivotable from a horizontal position in which the suction opening is positioned within the aperture, to inclined positions in which the aperture is raised above the suction opening. A biasing means urges the plate into its horizontal position and a means is provided for applying a partial vacuum to the suction tube. Additionally, a means is provided for moving the applicator between a first position, adjacent the label transport, in which a label ejected from the label transport is received onto the label supporting plate and held thereon by the suction applied to the label through the suction opening, and a second position, in which the applicator is positioned in the label application opening with the label supporting plate raised substantially above the package support. The plate in the second position contacts a package to which the label is to be applied and is pivoted by the weight of the package such that the effect of the suction applied to the label through the suction opening is reduced substantially. The label is thereby released from the applicator and applied to the bottom of the package.

The label may be applied to the bottom of the package at a point adjacent the bottom edge of the package with the label supporting plate mounted to pivot about pivot points substantially closer to the center of the bottom of the package than the suction opening. The label supporting plate may include a pair of downwardly extending pivot arms with the applicator body including a pair of upwardly extending pivot arms. Each of the upwardly and downwardly extending pivot arms defines a pivot opening therein. A pivot bolt extends through the pivot openings in the upwardly and downwardly extending pivot arms to provide for pivoting of the label supporting plate. The biasing means comprising a torsion spring is positioned on the pivot bolt for engaging the applicator body and the label supporting plate and urging the plate into its horizontal position. The top of the suction tube defining the suction opening is positioned below the upper surface of the label supporting plate by at least a predetermined minimum clearance when the plate is in its horizontal position.

Other arrangements of the applicator body, suction tube and label supporting plate are possible in accordance with the principles of the present invention wherein a label may be applied to other areas of a package if desired. For instance, for application of a label to the top of a package, the applicator body is located above the package with the plate supported on the applicator body so as to face downwardly toward the package and be disposed in a first inclined position relative to the surface area of the package to which the label is to be applied. The label is received on the downwardly facing plate and held thereon by suction. Thereafter, through downward movement of the applicator body and plate, and the suction tube therewith, the plate is brought into contact with the package. The plate is tilted about its pivotal mounting on the applicator body to a second position and the label is applied to the top of the package. With the plate in the second position, the label engaging effect of the suction is reduced substantially.

Accordingly, it is an object of the present invention to provide a package labeling system in which a label applicator holds a label thereon by suction, with a portion of the applicator pivoting during application of the label to a package in order to break the suction applied to the label; to provide such a package labeling system in which the label is applied to the bottom of a package and, during application of the label, a portion of the package is raised above the package support structure; to provide such a package labeling system in which tilting of the package as it is raised above the package support results in pivoting of the upper portion of the applicator.

DETAILED DESCRIPTION OF THE PREFERRED EMBODIMENT

Figure 1:
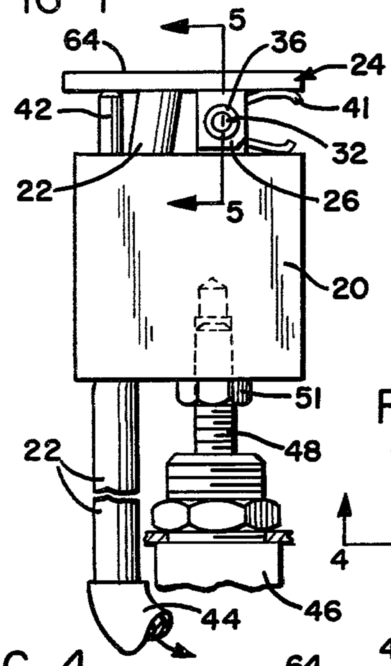
FIG. 1 is a front view of the applicator and associated structure of the package labeling system of the present invention.
Figure 2:
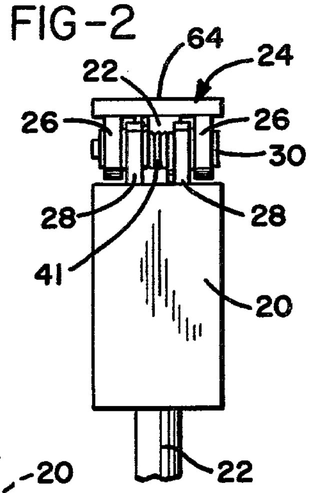
FIG. 2 is a side view of the applicator, as seen looking right to left in FIG. 1.
Figure 3:
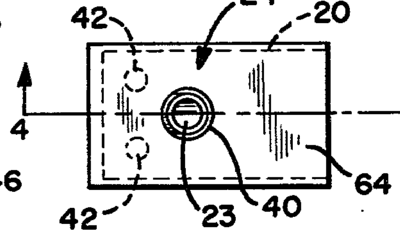
FIG. 3 is a top view of the applicator of FIG. 1.
Figure 5:
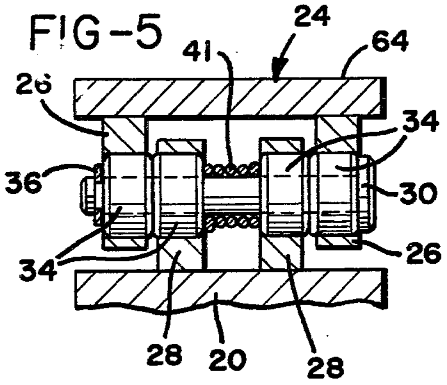
FIG. 5 is an enlarged partial sectional view of the top portion of the applicator, taken generally along line 5—5 in FIG. 1.

Reference is now made to FIGS. 1-3, which illustrate an applicator for use in a package labeling system embodying the present invention. The applicator includes an applicator body 20 and a suction tube 22, extending through the applicator body 20 and defining a suction opening 23 above the body. A label supporting plate 24 is positioned above the applicator body 20 and is pivotally mounted thereon. The label supporting plate 24 includes a pair of downwardly extending pivot arms 26 and the applicator body 20 includes a pair of upwardly extending pivot arms 28. As seen most clearly in FIG. 5, a pivot bolt 30 extends through pivot openings in the pivot arms 26 and 28 such that the label supporting plate 24 may be pivoted about pivot point 32. Bushings 34 in pivot arms 26 and 28 facilitate the pivoting action of plate 24. Bushings 34 may advantageously be formed of brass and pressed into openings in the pivot arms 26 and 28. Bolt 30 is held in position by means of snap ring 36 which snaps into a circumferential groove on the end of bolt 30.

Figure 4:
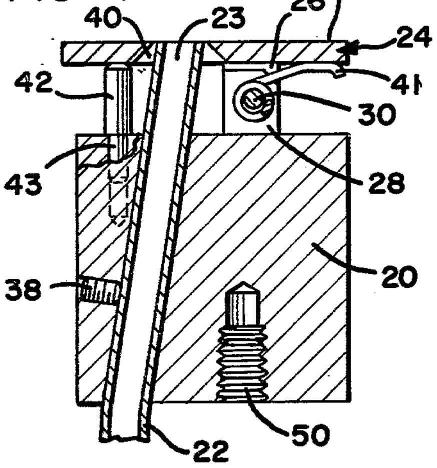
FIG. 4 is a sectional view of the applicator, taken generally along line 4—4 in FIG. 3, with portions broken away.

As seen in FIG. 4, suction tube 22 is held in position within applicator body 20 by means of set screw 38. Additionally, suction tube 22 may also be bonded to applicator body 20 by an adhesive, such as an epoxy resin. Suction tube 22 extends above the body 20 into a suction tube aperture 40 in the label supporting plate 24. The suction tube aperture 40 increases in diameter toward the bottom of the plate 24 to provide sufficient clearance for pivoting the plate 24. A biasing means, which advantageously may comprise torsion spring 41, is mounted on the pivot bolt 30 and engages the plate 24 and the applicator body 20 to urge the plate 24 into a horizontal position. Plate positioning pins 42 are pressed into corresponding openings 43 in applicator body 20. Pins 42 are of an appropriate length such that they prevent the spring 41 from pivoting the plate 24 past the horizontal position illustrated in FIGS. 1-5. If desired, pins 42 may be secured within openings 43 by an adhesive.

Suction tube 22 is connected by flexible tube 44 to a suction pump (not shown) for applying a partial vacuum to the tube. The body 20 is attached to a means for moving the applicator, including pneumatic cylinder 46. The piston rod 48 of cylinder 46 extends into threaded opening 50 within the applicator body 20. After the threaded end of cylinder piston 48 is threaded into opening 50 in the body 20, nut 51 is tightened to secure the applicator body 20 in position.

Figure 6:
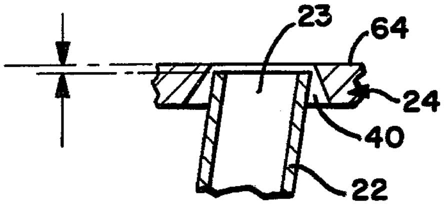
FIG. 6 is an enlarged fragmentary sectional view of the upper portion of the applicator of FIG. 4.
Figure 7:
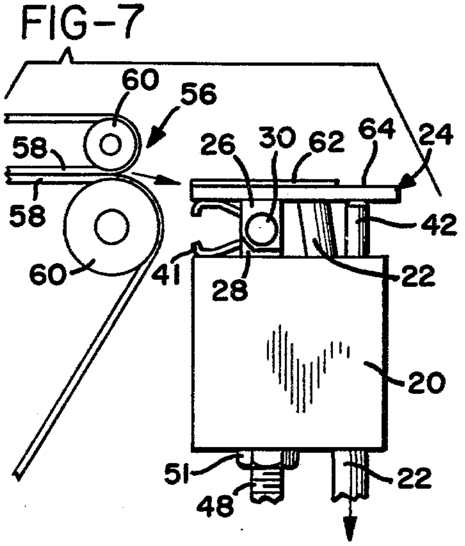
FIG. 7 is a view illustrating the manner in which a label is received from a label transport by the package labeling system of the present invention.
Figure 8:
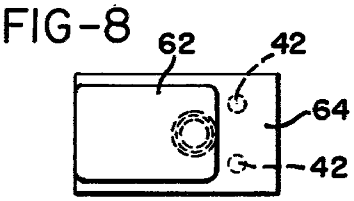
FIG. 8 is a top view of the applicator after receipt of a label.

FIGS. 6, 7, and 8 illustrate the manner in which a label is caught by the applicator as it is ejected from a label transport. Only a portion of the label transport 56 is illustrated in FIG. 7. The transport may generally be of the type shown in the above referenced patent to Berner. In such a transport arrangement, the label is held between flexible belts 58 which pass around pulleys 60. The label is ejected from the transport as indicated in a substantially horizontal trajectory toward the label supporting plate 24.

The label 62 is drawn onto the label supporting surface 64, defined by the top of plate 24, by the flow of air into the suction opening 23, which opening communicates with the suction tube aperture 40 in the label supporting plate 24. It has been found that providing a substantial air flow results in a high degree of accuracy in positioning the label 62 on the label supporting surface 64 and insures that the label is held on the label supporting surface 64 during the label application process.

As seen in FIG. 6, the top of the suction tube 22 is positioned slightly below the label supporting surface 64. As a result, the portion of the label positioned above the aperture 40 will be drawn slightly downward into the aperture 40, thus creating a dimpling effect in the label. Dimpling the label as it is caught enhances the positive catching action of the applicator. It has been found that the top of suction tube 22 need be positioned only approximately 0.003 inches below the surface 64 in order for the desired dimpling effect to occur.

Figure 9:
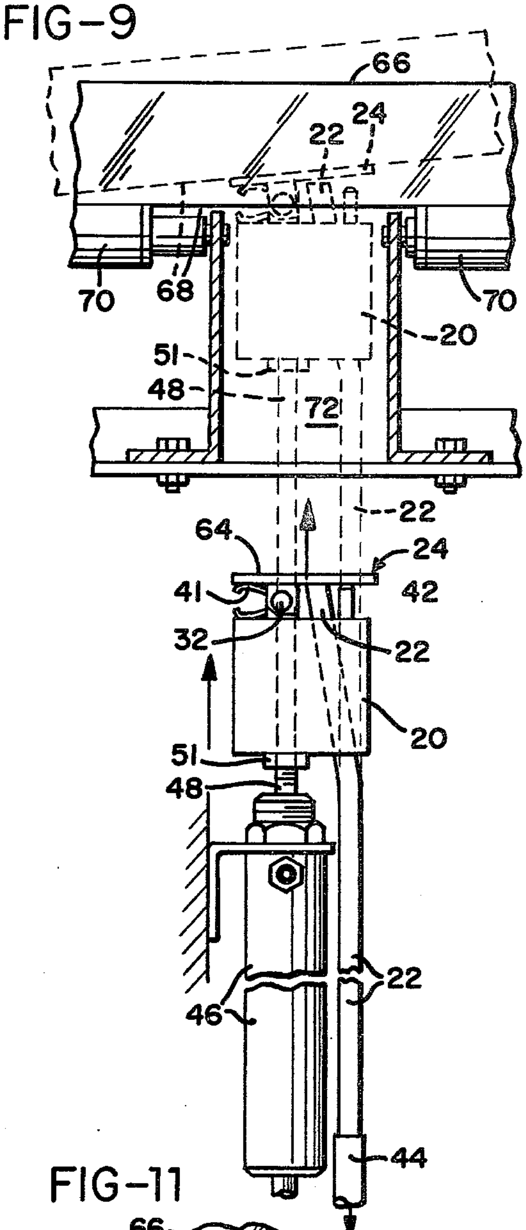
FIG. 9 is a view illustrating the manner in which a label is applied to the bottom of a package having a substantially flat bottom surface.

FIG. 9 illustrates the manner in which an adhesively backed label is applied to the bottom of a package 66, having a substantially flat bottom surface 68. A package support, such as a roller conveyor including rollers 70, as described in the Treiber et al patent, includes a label application opening 72 therein. Package 66 is positioned on the package support, above the label application opening 72, with the center of the package bottom offset with respect to the opening.

The applicator, having previously caught a label ejected from a label transport, as illustrated in FIG. 7, by means of the suction applied through the suction tube 22, is raised through the label application opening 72 to a label application position illustrated in dashed lines. The bottom 68 of the package 66 is contacted by the label supporting plate 24 of the applicator and raised out of contact with the package support 70. Since the center of the package bottom 68 is offset with respect to the label application opening 72, the package 66 is tilted as the plate 24 is raised above the level of the support 70. The weight of the package 66 on the plate 24 causes the plate to pivot and the label supporting surface 64 to be tilted. This, in turn, reduces the label holding effect of the suction applied to the label through suction tube 22, permitting the adhesive on the label 62 to adhere firmly to the bottom of the package and preventing the label from thereafter being pulled off the package bottom. The applicator is then lowered to the position shown in solid lines in FIG. 9 in preparation for catching a label subsequently delivered to the applicator by the label transport.

Figure 10:
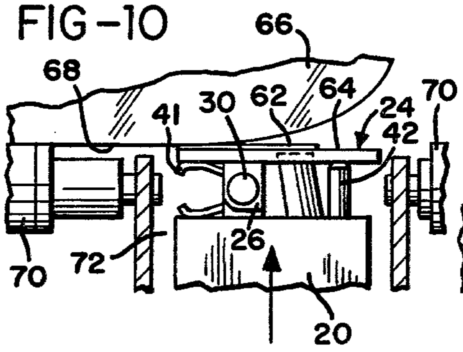
FIGS. 10 and 11 illustrate the manner in which a label is applied to the bottom of a package having a curved or bowed bottom surface.
Figure 11:
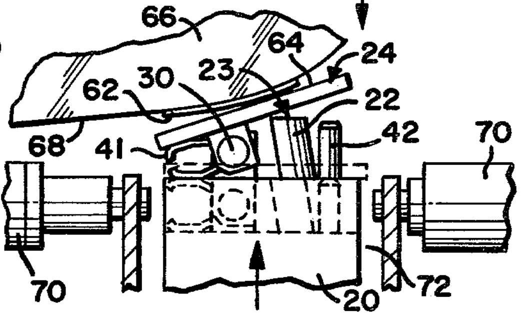

FIGS. 10 and 11 illustrate the manner in which a label is firmly applied by the present invention to a package having a curved bottom surface. As discussed above, when produce in a boat is wrapped tightly with a cellophane type wrapping, a package having a curved bottom may result. The applicator of the present invention will firmly apply the adhesive label even to such a package, since the label supporting surface 64 is tilted in the direction of curvature as illustrated in FIG. 11. By raising the label applicator to an application position approximately ⅜ inch above the applicator position shown in FIG. 10, in which the label initially contacts the package bottom, the plate 24 is tilted sufficiently by the weight of the package 66 such that the holding action of the suction tube 22 is terminated. Additionally, pressure is applied along the entire surface of the label such that the label is firmly mounted on the bottom 68 of the package, even though the bottom surface is curved.

It will be appreciated that numerous modifications may be made in the structure shown in the drawings which are within the scope of the present invention. For instance, although the plate 24 is pivoted solely as a result of the weight of the package pressing down upon the plate, in some labeling systems it may be desired to provide a mechanical linkage, connected to the air cylinder 46 or co-operating with the package support 70, for tilting the plate 24. This might be advantageous in the situation where extremely lightweight packages are to be labeled. If a sufficiently weak spring 42 were to be used to permit the weight of an extremely light package to pivot or tilt the plate 24, the spring might not have sufficient force to prevent the plate 24 from being pivoted due to its inertia during movement of the applicator.

Other arrangements of the applicator body, suction tube and label supporting plate are possible in accordance with the principles of the present invention wherein a label may be applied to other areas of a package if desired. For instance, for application of a label to the top of a package, the applicator body is located above the package with the plate supported on the applicator body so as to face downwardly toward the package and be disposed in a first inclined position relative to the surface area of the package to which the label is to be applied. The label is received on the downwardly facing plate and held thereon by suction. Thereafter, through downward movement of the applicator body and plate, and the suction tube therewith, the plate is brought into contact with the package. The plate is tilted about its pivotal mounting on the applicator body to a second position and the label is applied to the top of the package. With the plate in the second position, the label engaging effect of the suction is reduced substantially.

While the method herein described, and the form of apparatus for carrying this method into effect, constitute preferred embodiments of the invention, it is to be understood that the invention is not limited to this precise method and form of apparatus, and that changes may be made in either without departing from the scope of the invention.

What is claimed is:

1. In a package labeling system in which an adhesively backed label is received from a label transport with the adhesive side of the label facing upward and, thereafter, applied to the bottom of a package through a label application opening in a package support, the improvement comprising:

an applicator, including an applicator body, a suction tube extending through said applicator body and defining a suction opening above said body, a label supporting plate positioned above said applicator body and pivotally mounted thereon, said plate defining a suction tube aperture, and said plate being pivotable from a horizontal position in which said suction opening is positioned within said aperture, to inclined positions in which said aperture is raised above said suction opening, and biasing means for urging said plate into said horizontal position, means for applying a partial vacuum to said suction tube, and means for moving said applicator between a first position adjacent the label transport, in which a label ejected from said label transport is received onto said label supporting plate and held thereon by the suction applied to said label through said suction opening, and a second position, in which said applicator is positioned in said label application opening with said label supporting plate raised substantially above said package support, said plate in said second position contacting a package to which the label is to be applied and being pivoted by the weight of the package such that the effect of said suction applied to said label through said suction opening is reduced substantially, whereby said label is released from said applicator and applied to the bottom of the package.

2. The package labeling system of claim 1 in which the label is applied to the bottom of the package at a point adjacent a bottom edge of the package and in which said label supporting plate is mounted to pivot about pivot points substantially closer to the center of the bottom of the package than said suction opening.

3. The package labeling system of claim 2 in which said label supporting plate includes a pair of downwardly extending pivot arms and said applicator body includes a pair of upwardly extending pivot arms, each of said upwardly and downwardly extending pivot arms defining a pivot opening therein, and in which the said applicator further comprises a pivot bolt extending through said pivot openings in said upwardly and downwardly extending pivot arms.

4. The package labeling system of claim 3 in which said biasing means comprises a torsion spring positioned on said pivot bolt for engaging said applicator body and said label supporting plate and urging said plate into said horizontal position.

5. The package labeling system of claim 1 in which the top of said suction tube defining said suction opening is positioned below the upper surface of said label supporting plate by at least a predetermined minimum clearance when said plate is in said horizontal position.

6. Label application apparatus for applying an adhesively backed label to the bottom of a package, comprising:

a label transport for ejecting a label with said adhesive side thereof facing upward, means defining a label supporting surface, having an aperture therein, for receiving and supporting a label ejected by said transport, suction means for providing a suction through said aperture to a label supported by said surface, means for moving said means defining a label supporting surface upwardly from said label transport into contact with the bottom of a package, pivot means mounting said means defining said label supporting surface on said suction means such that said surface is substantially horizontal as a label is received thereon and tilted as a label is applied to the bottom of a package, whereby the label engaging effect of said suction means is reduced substantially during application of a label to a package such that the label is released from the label supporting surface.

7. The label application apparatus of claim 6 further comprising means biasing said means defining a label supporting surface toward a substantially horizontal label receiving position and permitting said surface to be inclined only during application of said label to said package.

8. The label application apparatus of claim 7 in which said means defining a label supporting surface is moved upward during application of a label to the bottom of a package such that the bottom of the package is tilted, thereby tilting said label supporting surface away from said suction means.

9. The method of receiving an adhesively backed label ejected from a label transport with the adhesive side of the label facing upward and applying the label to the bottom of a package, comprising the steps of:

(a) providing a package support having a label application opening therein, (b) positioning a package on the package support above said label application opening, with the center of the package bottom offset with respect to said label opening, (c) catching a label ejected from said label transport, with the adhesive side of the label facing upward, on a flat horizontal label supporting surface by means of a suction applied through a suction tube communicating with an aperture in the surface, said surface being positioned below said label application opening, (d) raising said surface through said label application opening, with a label positioned thereon, to a label application position in which the bottom of said package adjacent said label application opening is contacted by said surface and raised out of contact with said package support, and said label supporting surface is tilted to reduce the suction applied through said aperture by said suction tube, whereby the adhesive side of said label causes said label to adhere to the bottom of said package.

10. The method of claim 9 in which said label supporting surface is tilted downward generally toward the center of the package bottom by the weight of the package as the bottom of the package adjacent said label application opening is raised out of contact with said package support.

11. The method of claim 10 in which said label supporting surface is biased toward a horizontal position such that it remains horizontal until raised into said label application position.

12. Label application apparatus for applying an adhesively backed label to a package, comprising:

a label transport for ejecting a label, means defining a label supporting surface, having an aperture therein, for receiving and supporting a label ejected by said transport with the adhesive side of said label facing away from said surface, suction means for providing a suction through said aperture to a label supported by said surface, means for moving said means defining a label supporting surface from said label transport and into contact with a package, and pivot means mounting said means defining said label supporting surface on said suction means such that said surface is in a first position as a label is received thereon and tilted from said first position as a label is applied to the package, whereby the label engaging effect of said suction means is reduced substantially during application of the label to the package and the label is released from the label supporting surface.

* * * * *